Dec. 26, 1950 R. R. RIESCHICK 2,535,813

MEANS FOR TUNING ACCORDIONS

Filed July 2, 1948 2 Sheets-Sheet 1

INVENTOR.
Richard R. Rieschick
BY C. P. Goepel
his ATTORNEY

Dec. 26, 1950 R. R. RIESCHICK 2,535,813

MEANS FOR TUNING ACCORDIONS

Filed July 2, 1948 2 Sheets-Sheet 2

INVENTOR.
Richard R. Rieschick
BY C. P. Goepel
his ATTORNEY

Patented Dec. 26, 1950 2,535,813

UNITED STATES PATENT OFFICE 2,535,813

MEANS FOR TUNING ACCORDIONS

Richard R. Rieschick, New York, N. Y.

Application July 2, 1948, Serial No. 36,591

4 Claims. (Cl. 84—456)

This invention relates to means for tuning accordions.

Heretofore, some difficulties have attended the tuning of accordions. Such tuning required the skill of specialists. The object of this invention is to provide a tuning table by the use of which the tuning of accordions may be efficiently carried out by relatively unskilled operators. At least, by the improved tuning table, tuners may be readily educated.

The invention contemplates a plurality of superposed plates each having a plurality of openings in registration with each other, and subject to a pressure and suction action controlled by slides, operated by the tuner. A normal or standard scale of true pitches of tuned reeds corresponding to the chromatic scale, is used to give the standard pitch tone. This block of reeds is placed over one series of openings. Thereafter, the accordion to be tuned is placed over another series of openings, also controlled by slides, and each reed is tuned, to one of the standard pitch tones, in which tuning the reeds of the accordion are adjusted by filing or the like, until the consonance of tone with the key pitch is obtained.

The invention will be more fully described hereinafter, an embodiment thereof shown in the drawings, and the invention will be finally pointed out in the claims.

In the accompanying drawings.

Similar characters of reference indicate corresponding parts throughout the various views.

Figures 1, 2, 3:
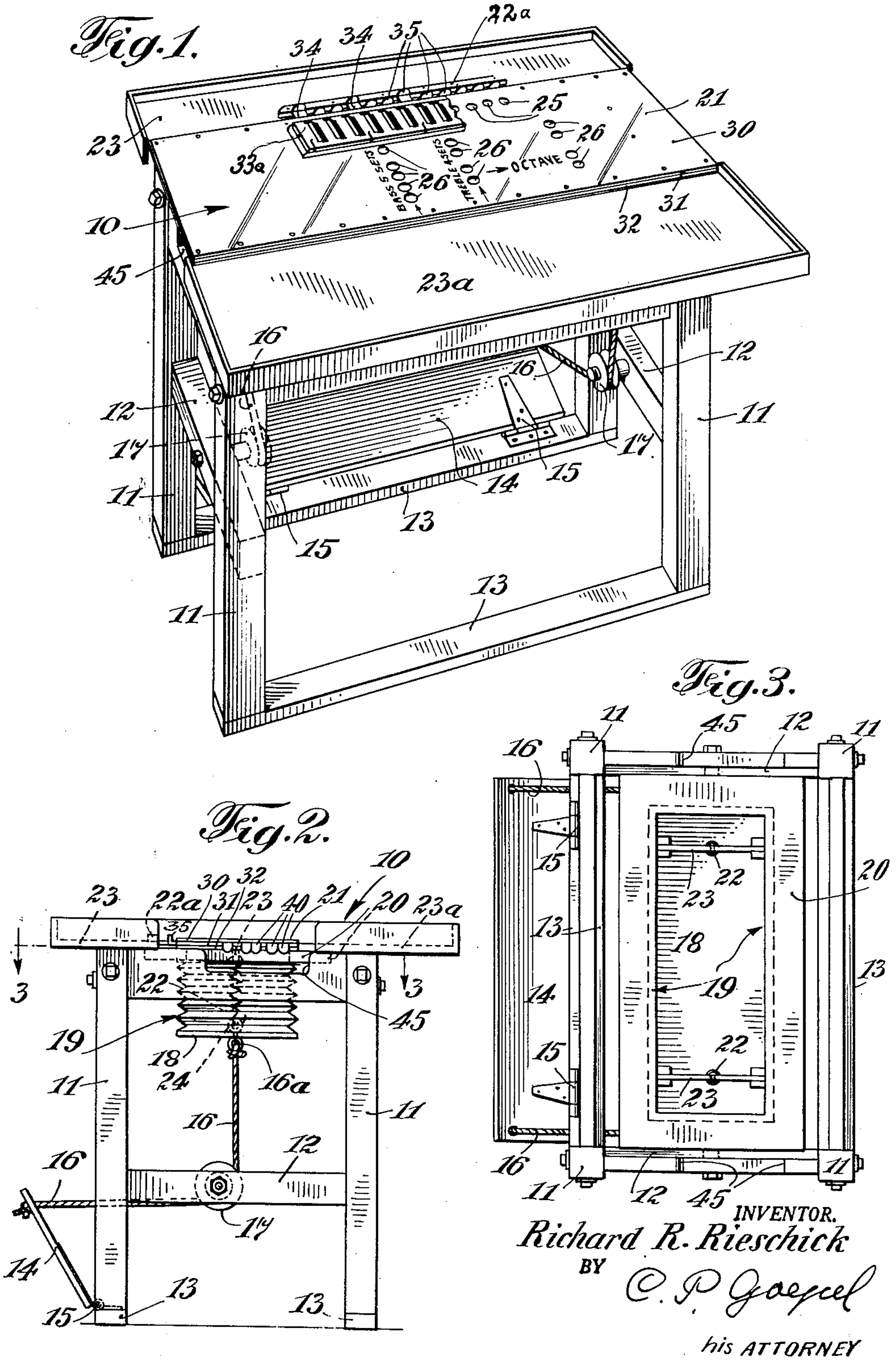
Fig. 1 is a perspective view of the improved tuning table.
Fig. 2 is an end view of the same.
Fig. 3 is a horizontal section taken on line 3—3 of Fig. 1.

Referring to the drawings, a table 10 has legs or standards 11, cross bars 12, and longitudinal bars 13. To one longitudinal bar 13, a foot pedalboard 14 is hinged at 15. The upper end of the pedalboard 14 is secured to ropes 16, which pass around pulleys 17, each supported by each of the cross bars 12. The other end of the ropes 16, are secured to the movable end 18 of a bellows 19, by being secured to eyes 16*a*, which has its fixed frame 20 of the bellows secured to the underside of the table top 21. Within the bellows are springs 22, one end of each of which is secured to a flat iron piece 23, and the other end of each of which is secured to an eye 24. The eyes 24 and the eyes 16*a* are secured to the movable end 18. The table top 21 has two covers 23 and 23*a*, secured to the legs 11 and to the top 21. These tops 23 and 23*a* may be hinged by a piano hinge, or the like to cover the top 21. The tops 23 and 23*a* are used for tools or the like. The top 23 has a guard 22*a* to limit the movement of the slides (Fig. 2). The bellows operating devices described may be changed in any suitable manner, as long as a bellows action is provided for creating a pressure or suction effect upon spaced openings, now generally referred to as 25 and 26, and shown for example in Fig. 1.

Figures 4, 5, 6, 7, 8, 9:
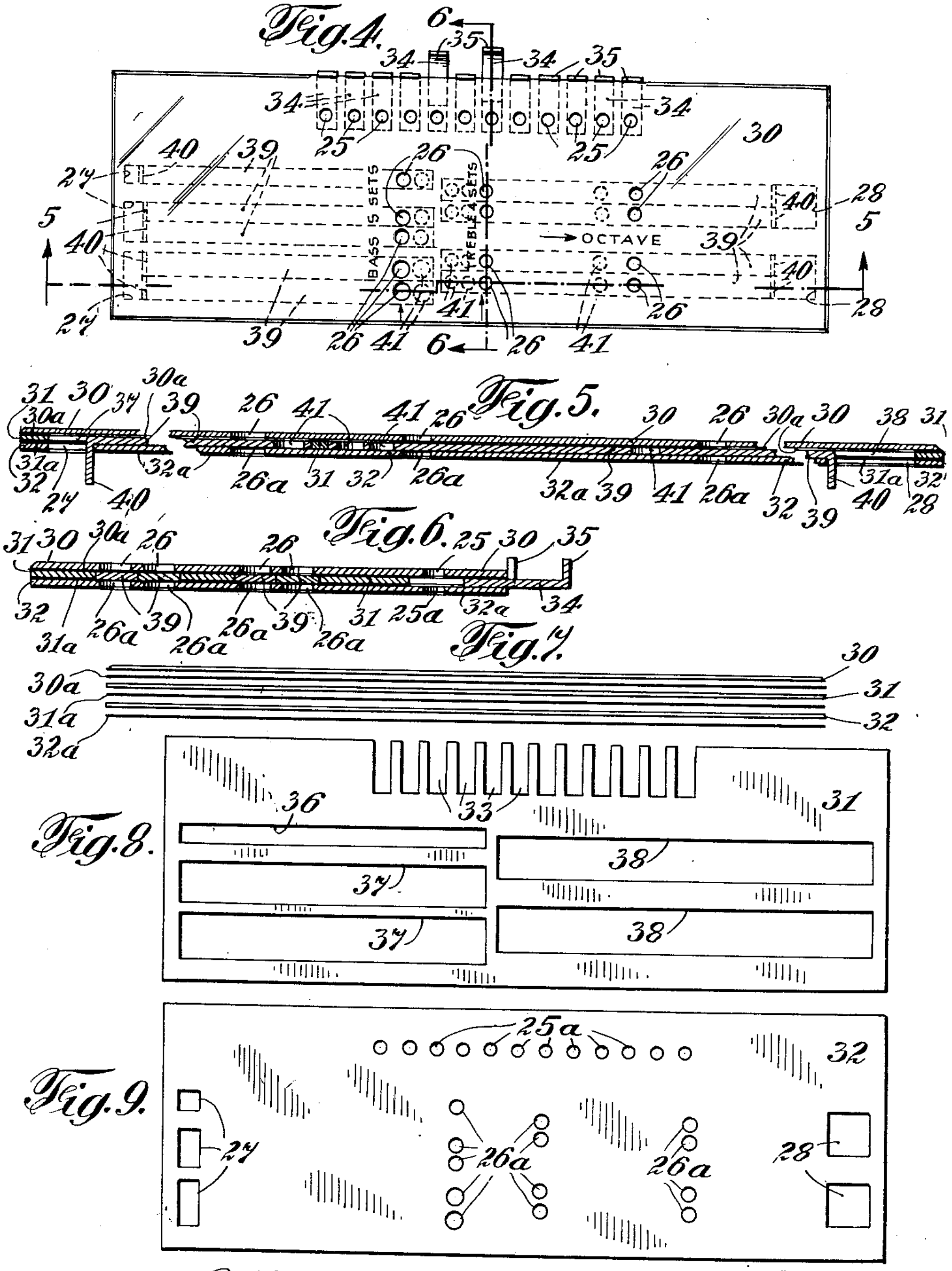
Fig. 4 is a plan view of the table proper or top of the table.
Fig. 5 is a vertical section taken on line 5—5 of Fig. 4 of larger scale.
Fig. 6 is a vertical section taken on line 6—6 of Fig. 4.
Fig. 7 is a side view of the plates composing the top of the table, shown separated from each other.
Fig. 8 is a plan view of the center plate.
Fig. 9 is a plan view of the bottom plate of the top.

The table proper 21 is composed of three superposed parts 30, 31 and 32, each having gaskets 30*a*, 31*a* and 32*a* (Fig. 7). The central top 21 is screwed to the bellows frame 20, and the latter frame to the table units 23, 23*a*.

The uppermost plate 30 (Fig. 4) has the aforesaid openings 25 and 26, each of circular shape; the openings 25 being twelve in number, corresponding to the chromatic scale, and arranged in a line and spaced from each other. The openings 26 are spaced from each other as shown (Fig. 4).

The lowermost plate 32 (Fig. 7) has similar openings 25*a* and 26*a* in registration with the openings 25 and 26. This part 32 also has cutouts 27 and 28 (Fig. 7).

Figure 10:
Fig. 10 is a perspective view of one of the slides of Fig. 4.

The intermediary plate 32 (Fig. 8), has slots 33, twelve in number, for 12 separate slides 34, each having an upstanding handle 35 and constructed like the structure shown in Fig. 10, only of shorter size. The plate 31 also has slots 36, 37 and 38, arranged longitudinally with slots 36 and 37 at one side, and slots 38 at the other side of the part 31, for separate slides 39, having depending handle portions 40 as shown in Fig. 10, and each having an opening 41. The handles 40 protrude through the cutouts 27 and 28 of the plate 31, the walls of the cutouts limiting the movements of the slides.

The lowermost plate 32 (Fig. 7), forms the cover for a hollow part of the table, which is enclosed except for said openings on the top, and the bellows opening of the frame 20 at the bottom, and which enclosure is under pressure and suction upon the suitable operation of the bellows 19 by the means described.

In Figs. 5 and 6 the relationship of the parts 30, 31 and 32 are shown, with the sliding valve members therein disposed. Top plate 30 has a gasket 30*a* underneath of exactly the same shape and holes as plate 30; centerplate 31 likewise has a similar gasket 31*a*; and bottom plate 32 has a similar gasket 32*a*. The table 10 has a cutout 45 (Figs. 1, 2 and 3) to enable the slide handles 40 to be operated by the hand of the tester.

The principle of operation of the invention depends upon the registration of an opening in the top plate, with the corresponding opening in the bottom plate, and with the proper opening in a slide valve. When the slide valve has its opening out of registration with the openings above and below, the suction is blocked.

The twelve openings 25 correspond to the standard scale.

As known in the construction of accordions, there are, generally, nine sets of reeds, four sets for the treble or right side, and five sets for the bass or left side. For these reeds, seven blocks are used. For the treble there will be four blocks, with two blocks of twenty-four notes each, and two blocks with seventeen notes each. For bass, there will be three blocks, two blocks having two sets of notes and one block has one set of notes. Each of these bass blocks has twelve notes.

When the accordion notes are to be tested and tuned, one of these blocks is placed over either the treble or the bass openings in the table top, as the case may be, and then the block is shifted from one note to another, each note being made to conform with the standard note, by making the necessary adjustment in the reeds. In the case of the treble note blocks, these are so arranged that two notes, one the octave of the other, may be tested and brought into unison with the pitch of the standard master scale represented by the group 25.

It will be noted that the slides which have their handles operating in the cut out 28, have three openings. One of these is used for testing or tuning a single treble note. When an octave testing or tuning is desired, the slide is shifted so that the two holes spaced the necessary distance apart are brought into registration with the openings 26.

The gaskets 30*a*, 31*a*, and 32*a* shown in Fig. 7, are oiled sheets of paper, in order to provide air proof and waterproof closures between the plates 30, 31 and 32, and are punched or cut with openings and the necessary spaces for the slides.

In Fig. 1, a bank of reeds 33*a* is partially shown, as being over part of the openings 25.

As the tuning progresses the reeds are adjusted and filed.

Thus, each reed in the accordion is tuned to a tone corresponding to a standard tone.

This tuning operation may be easily carried out and an accordion tuner can learn his trade much quicker than is now the case.

I wish it to be understood that I do not desire to be limited to the exact details of construction shown and described for obvious modifications will occur to a person skilled in the art.

I claim:

1. In an accordion tuner, the combination with a plurality of master scale reeds having air supply openings, of an accordion reed block supporting plate having a plurality of openings, slides for each of said openings to open or close the same, bellows for forcing air through any of said openings which are opened by the slides, said reed block supporting plate being in a plane to permit the free shifting of the reed block having the reed to be tested until its opening registers with the corresponding opening in said plate, whereby the registering reed block reed may be tuned to one of said master scale reeds.

2. In an accordion tuner, the combination with a plurality of master scale reeds having air supply openings, of an accordion reed block supporting plate having a plurality of openings for the bass notes, a plurality of openings for the treble notes and a plurality of openings for the octaves of the treble notes spaced from the treble notes the distance between a treble note and its octave in the reed block, slides for each of said openings to open or close the same, and for the master scale reed openings, and a pressure and suction bellows for forcing air through any of said openings which are opened by the slides, said reed block supporting plate being in a plane to permit the free shifting of the reed block having the reed to be tested until its opening registers with the corresponding opening in said plate, whereby the registering reed block reed may be tuned to one of said master scale reeds, and the treble notes tuned in octave.

3. In an accordion tuner, the combination of a plate having openings corresponding to the twelve master scale notes of an accordion reed block, a plurality of openings for the treble notes of an accordion reed block, and a plurality of openings for the bass notes of an accordion reed block, slides for each of said openings to open or close the same, and a pressure and suction bellows for forcing air through any of said openings which are opened by the slides, a second plate with cut outs for the slides, a third plate with openings spaced to register with the openings of the first plate, and gaskets between the plates to provide air tight connections between the plates, said plate being in a plane to permit the free shifting of the reed block having the reed to be tested until its opening registers with the corresponding treble or bass opening in said plate.

4. In an accordion tuner, the combination of a plate having openings corresponding to the twelve master scale notes of an accordion reed block, a plurality of openings for the treble notes of an accordion reed block, and a plurality of openings for the bass notes of an accordion reed block, slides for each of said openings to open or close the same, and a pressure and suction bellows for forcing air through any of said openings which are opened by the slides, a second plate with cut outs for the slides, a third plate with openings spaced to register with the openings of the first plate, and gaskets between the plates to provide air tight connections between the plates, and a gasket below the third plate to air tight the bellows frame, said plate being in a plane to permit the free shifting of the reed block having the reed to be tested until its opening registers with the corresponding treble or bass opening in said plate.

RICHARD R. RIESCHICK.

REFERENCES CITED

The following references are of record in the file of this patent:

UNITED STATES PATENTS

| Number | Name | Date |
|---|---|---|
| 551,289 | Kappeler | Dec. 10, 1895 |
| 683,990 | Rosencrantz | Oct. 8, 1901 |
| 857,334 | Dolan | June 18, 1907 |
| 1,716,835 | Romanoff | June 11, 1929 |
| 2,208 228 | Rabuazzo | July 16, 1940 |
| 2,252,236 | Steele | Aug. 12, 1941 |